July 29, 1969   GEORGES-ALBERT GERTSCH ET AL   3,458,764
PROTECTIVE SYSTEM FOR CAPACITIVE VOLTAGE TRANSFORMERS Filed March 7, 1967                                2 Sheets-Sheet 1

INVENTORS
Georges-Albert Gertsch
Walter Knoth

By Pierce Scheffler & Parker
Attorneys

INVENTORS
Georges-Albert Gertsch
Walter Knoth

United States Patent Office 3,458,764
Patented July 29, 1969

3,458,764
PROTECTIVE SYSTEM FOR CAPACITIVE
VOLTAGE TRANSFORMERS
Georges-Albert Gertsch, Zurich, and Walter Knoth,
Oberengstringen, Switzerland, assignors to Micafil
A.G., Zurich, Switzerland, a joint-stock company
Filed Mar. 7, 1967, Ser. No. 621,277
Claims priority, application Germany, Mar. 18, 1966,
M 68,827
Int. Cl. H02h 7/14
U.S. Cl. 317—14     3 Claims

ABSTRACT OF THE DISCLOSURE

A capacitative voltage transformer is constituted by a string of capacitors connected in series between a high voltage line and ground to establish a voltage divider, and a transformer is employed which has its primary winding connected across one of the capacitors at the lower grounded end portion of the capacitor string through a choke coil. The secondary of this transformer is connected to a principal useful burden to provide for voltage measurement and/or control purposes. To protect the apparatus against undesirable oscillation phenomena, e.g. ferro-resonance, which may be caused by transients, an auxiliary damping burden is switched onto the transformer but only in the event that this phenomena actually arises. To detect the presence of such disturbing phenomena a part of the voltage on the capacitative voltage divider, where it is not connected in parallel to the transformer and choke coil, is compared, in a substractive manner with a voltage proportional to the voltage of the transformer and which is produced by use of a tertiary winding on the transformer. This latter voltage rises appreciably when the transient oscillation phenomena occurs and the difference voltage is used to switch the protective damping burden to the transformer.

Field of the invention

This invention relates to capacitative voltage transformers employing voltage dividers of the capacitive type wherein a string of capacitors is connected in series between a high voltage line and ground, and one or more taps are taken across the lower voltage end of the capacitor string for application to a transformer used for measurement or control purposes.

Description of the prior art

Capacitive voltage transformers are well known in the art and serve many different purposes, among which are:

(a) Voltage measurement.
(b) Transmission of high frequency signals by means of the high voltage line.
(c) Network protection.
(d) Supply of synchronizing devices.

The fundamental behaviour of capacitive voltage transformers is sufficiently known from previous literature on the subject. In this connection, reference is made to an article by G. A. Gertsch, in "Scientia Electrica," vol. VI, 1960, Nr. 1. Among the properties of a capacitative voltage transformer are its response characteristics. These are principally determined by two significant features, namely:

a circuit with inductances and capacitances,
the use of inductances with iron cores.

Because of the phenomenon of ferro-resonance, the above features can, in known manner with changes of electric conditions of the capacitive voltage transformer, such as switching-on and switching-off, short-circuits, transient waves and over-voltages cause extended transient phenomena, as well as internal over-voltages and voltage distortions.

In order to obtain a capacitive voltage transformer for a wide range of application, i.e. in order to realize besides its proporeties as coupling condenser, also as well as possible the abilities of an inductive voltage transformer (with its good response characteristic, and its high output) difference protective devices against ferro-resonance, transient phenomena and over-voltages have become known. Normally one tries to suppress such undesired oscillations with damping burdens. As this damping burden loads the transformer in the same manner as the useful burden it also impairs its accuracy and hence it is undesirable for normal operation. Therefore one uses switching means which connect the damping burden only if undesirable oscillations occur.

For the control of these switching means, different possibilities are known. Thus one can have them tripped by the amplitude of the secondary voltage as described in German patent specification No. 1,107,815. Another mode of tripping depends upon frequency with the aid of resonance circuits as described in German patent specification No. 1,055,681. In order to work accurately, this arrangement requires a great expenditure of material and adjusting work. A further possibility consists in that voltage changes are used as a tripping signal to connect in the damping burden as described in Swiss Patent No. 327,751. Here the danger of an insecure tripping appears, especially with short voltage interruptions. The tripping can also be brought about dependent on the primary current of the intermediate transformer as described in German patent specification No. 1,108,319.

However, all of the mentioned arrangements are insecure or fail in the case of sub-harmonic oscillations (frequency of sub-harmonic oscillations lower than net frequency), because currents and voltages of stable sub-harmonic oscillations can be lower than the maximum permissible currents and voltages with rated net frequency.

In this respect the arrangement which compares the primary and secondary currents of the intermediate transformer and uses their differences as tripping criterium brings about an improvement as described in German patent specification No. 1,068,807. Yet this arrangement too fails in the moment when the ferro-resonance is caused by the inductance of the burden and the intermediate transformer is not saturated.

In all these mentioned arrangements, voltages and currents are measured and evaluated only in the inductive circuit (circuit of intermediate voltage and/or circuit of burden).

Summary

A considerable improvement results when, according to the present invention, a part of the voltage on the capacitative voltage divider, where it is not connected in parallel to the transformer and choke coil, is compared in a subtractive manner with a voltage proportional to the voltage of the intermediate transformer, this proportional voltage being produced by a tertiary winding on the transformer, and the resulting different voltage is then used for switching on the protective damping equipment. The tertiary winding can be insulated from the primary winding of the transformer, or it can be a continuation of the primary winding thus eliminating the need for insulation of the remainder from the primary if the choke coil normally used between the transformer primary and the tap point on the capacitor voltage divider string is located between the grounded end of the voltage divider and the transformer. Further simplification can take place by connecting the voltage comparison capacitive section between ground and the ground-sided connection of the measuring section of the divider with the transformer, and also by connecting correspondingly the tertiary winding of the transformer in series with the difference voltage output terminals (for connecting the device to switch on the protective damping burden) between ground and the ground-sided end of the transformer primary winding.

Description of the preferred embodiments

Figure 1:
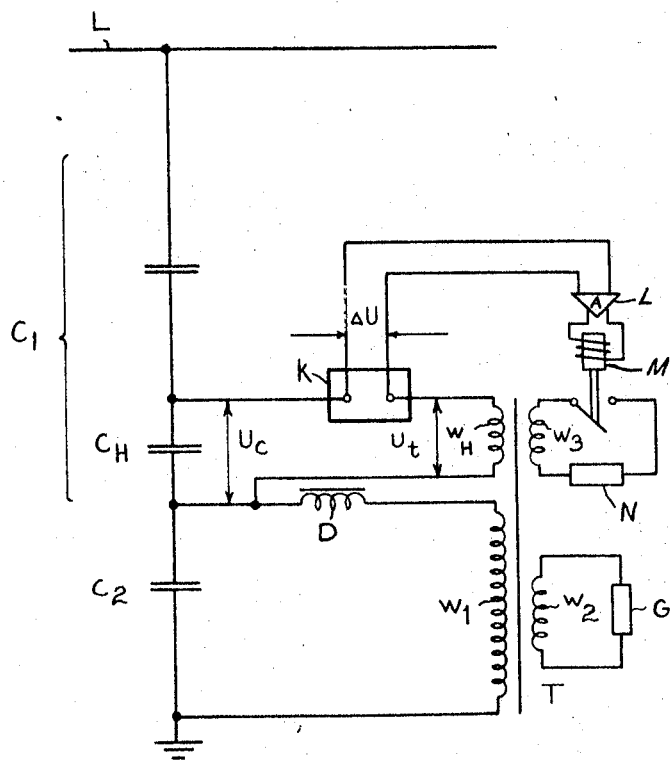
FIG. 1 of the accompanying drawings is an electrical schematic diagram of one embodiment of the improved capacitive voltage transformer with its built-in protective features.

With reference now to the drawing, the capacitive voltage transformer includes capacitance sections $C_1$ and $C_2$ connected in series between a high voltage line L and ground. The higher voltage section $C_1$ closer to line L is comprised of a large number of capacitors connected in series, the lowermost one of which is designated $C_H$. The lower voltage section, i.e. the one closest to the ground terminal and connected between ground and the lower terminal of capacitor $C_H$ is designated by the capacitor section $C_2$ and this section, as in the case of section $C_1$, also includes several series connected capacitor elements through a far smaller number than in section $C_1$. In accordance with conventional practice in designing voltage transformers of the capacitive type, a transformer T is employed, one main primary winding $W_1$ of this transformer being connected in series with a core type choke-coil unit D and which is connected across the terminals of the lowermost capacitor section $C_2$ in the string of capacitors which constitute the voltage divider. Thus one end of primary winding $W_1$ is connected to ground and the other end of this winding is connected through choke-coil D to a tap on the capacitor string between capacitors $C_H$ and $C_2$. The secondary for the transformer is indicated at $W_2$ and its output terminals are connected to the load, indicated generally by letter G.

In accordance with this invention, a very secure indication of the presence of the above-mentioned undesired oscillations is obtained by means which provide for comparison of a voltage on a section of the capacitive voltage divider, where it is not connected in parallel to the transformer and choke coil, with the voltage in the inductive circuit (medium voltage circuit or burden circuit) on the transformer T with respect to the content of harmonics and subharmonics and/or amplitude proportionality. A suitable reference voltage $U_c$ proportional to the voltage at the high voltage section is that which one obtains across capacitor $C_H$ but it is to be understood that this voltage tap may be taken at any arbitrarily chosen point above the medium voltage circuit. The voltage in the inductive circuit is produced by providing an insulated tertiary winding $W_H$ on the transformer T, the voltage on which is designated by $U_t$. Under normal service conditions, this voltage shall have the same amplitude as that of $U_c$ and is almost coincident in phase.

The two voltages $U_c$ and $U_t$ are connected in opposition i.e. in a subtractive manner and the difference voltage output at terminals K, is applied to the input of an amplifier unit L. The resulting difference $\Delta U$ is, in normal operation, as small as possible and is caused only by the useful secondary burden G, normally an impedance with an inductive power factor. In the event that undesired oscillations occur in the inductive circuit, the difference voltage $\Delta U$ will considerably exceed its normal minimal value and can then be used as a tripping signal at the output of the amplifier unit L for actuating a switching relay M to connect the damping burden N to an auxiliary secondary winding $W_3$ of transformer T. Instead of a separate secondary winding $W_3$, the damping burden can be connected as an additional load on secondary winding $W_2$.

Figure 2:
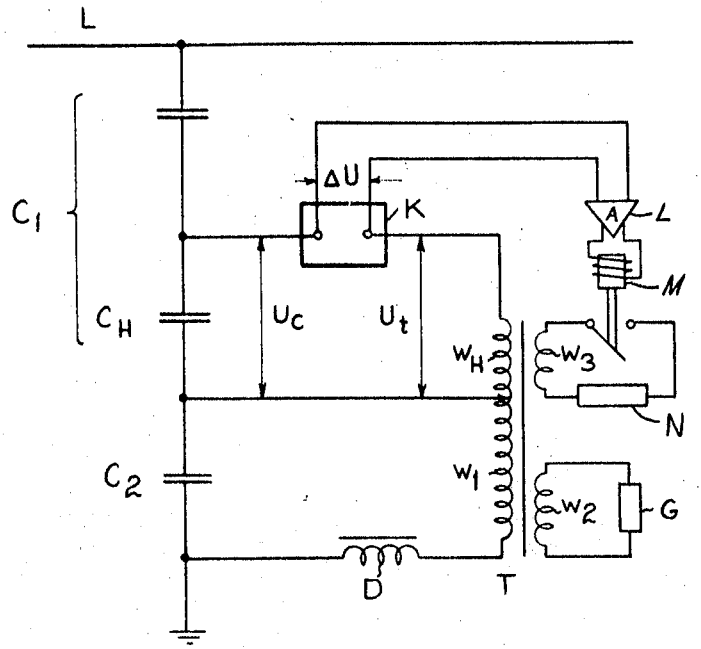
FIGS. 2 and 3 are likewise electrical schematic diagrams illustrating two modifications of the circuit arrangement illustrated in FIG. 1.

A simplification of the invention results if, as illustrated in FIG. 2, the tuning choke-coil D which is connected normally between the measuring tap between capacitors on the capacitive divider and the transformer T is placed between the grounded side of the divider and transformer T. It is then not necessary to insulate the tertiary winding from the primary winding of the transformer so that the tertiary winding can be established simply by a continuation of the turns of the primary winding.

Figure 3:
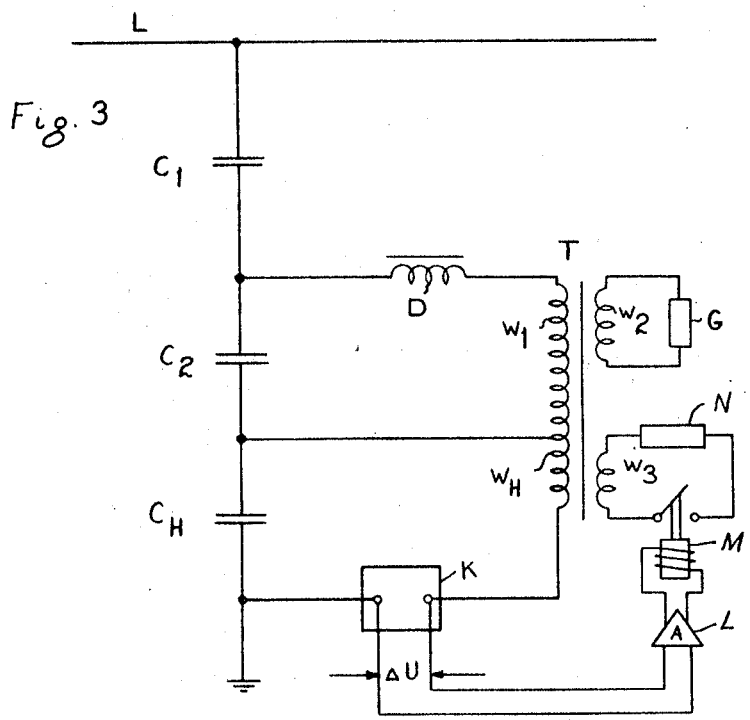

Further simplification of the invention results, as illustrated in FIG. 3, by connecting the comparison capacitive section $C_H$ between ground and the ground-sided connection of the measuring section $C_2$ of the divider with the intermediate transformer, and also by connecting correspondingly the tertiary winding of this transformer in series with the control voltage output terminals between ground and the ground-sided end of the primary winding of the transformer. As in the case of the embodiment of FIG. 2, the tertiary winding $W_H$ on the transformer need not be insulated from the main winding $W_1$ and can constitute a continuation of the latter.

We claim:

1. In a capacitive voltage transformer arrangement, the combination comprising a large number of capacitors connected in series between a high voltage line and ground to establish a capacitive voltage divider, a transformer having a primary winding and a tuning choke-coil in series therewith connected across a lower voltage portion of said voltage divider, a secondary winding having output terminals for connection to the desired load, and a tertiary winding producing a comparison voltage, means tapping from said voltage divider a voltage which during normal operation only of said transformer is substantially equal in amplitude and phase with said comparison voltage, means for producing a difference voltage equal to the difference between said two voltages, and switching means responsive to said difference voltage for switching in a damping burden on said transformer thereby to protect said transformer against undesired oscillation effects.

2. A capacitive voltage transformer as defined in claim 1 wherein said tuning choke-coil is connected between one end of said transformer primary winding and the grounded side of said voltage divider and said tertiary winding constitutes a continuation of the winding turns of said transformer primary.

3. A capacitive voltage transformer as defined in claim 1 wherein said tertiary winding connected in series with the difference voltage output terminals, as well as the capacitative comparative tapping voltage, are connected in circuit between the ground sided end of said voltage divider and ground.

References Cited

UNITED STATES PATENTS 1,994,279   3/1935   Higgins _____ 323—61 X
2,510,631   6/1950   Harder _____ 323—61 X
3,111,619   11/1963  Gertsch _____ 323—61

JOHN F. COUCH, Primary Examiner

G. GOLDBERG, Assistant Examiner

U.S. Cl. X.R.

307—93, 104; 317—16, 50; 323—61, 66, 81